(12) United States Patent
Chen et al.

(10) Patent No.: US 8,014,676 B2
(45) Date of Patent: Sep. 6, 2011

(54) CMOS-COMPATIBLE TUNABLE MICROWAVE PHOTONIC BAND-STOP FILTER

(75) Inventors: Young-Kai Chen, Berkeley Heights, NJ (US); Sanjay Patel, New Providence, NJ (US); Mahmoud Rasras, Berkeley Heights, NJ (US); Kun-Yii Tu, Califon, NJ (US)

(73) Assignee: Alcatel Lucent, Paris (FR)

( * ) Notice: Subject to any disclaimer, the term of this patent is extended or adjusted under 35 U.S.C. 154(b) by 714 days.

(21) Appl. No.: 12/035,677

(22) Filed: Feb. 22, 2008

(65) Prior Publication Data

US 2009/0214223 A1    Aug. 27, 2009

(51) Int. Cl.
*H04B 10/04* (2006.01)
*H04J 14/02* (2006.01)

(52) U.S. Cl. ............ 398/85; 398/82; 398/183; 398/185; 398/192; 398/198

(58) Field of Classification Search .............. 398/182, 398/183, 185–188, 192, 194, 198, 202, 208, 398/211
See application file for complete search history.

(56) References Cited

U.S. PATENT DOCUMENTS

| | | | |
|---|---|---|---|
| 6,389,203 B1 | 5/2002 | Jordan et al. | |
| 6,580,532 B1 | 6/2003 | Yao et al. | 359/111 |
| 6,731,922 B1 | 5/2004 | Strutz et al. | 455/302 |
| 6,943,931 B1 | 9/2005 | Dingel | 359/279 |
| 6,993,480 B1 | 1/2006 | Klayman | 704/226 |
| 7,142,309 B2 | 11/2006 | Miyazaki et al. | |
| 7,181,093 B2 | 2/2007 | Yap et al. | 385/1 |
| 7,187,870 B2 * | 3/2007 | Ilchenko et al. | 398/161 |
| 7,200,299 B1 | 4/2007 | Earnshaw | |
| 7,308,160 B2 | 12/2007 | Gill et al. | |
| 7,389,053 B1 | 6/2008 | Ilchenko et al. | 398/183 |
| 2003/0175036 A1 | 9/2003 | Mamyshev et al. | |
| 2003/0235367 A1 | 12/2003 | Yamazaki | |
| 2004/0165893 A1 | 8/2004 | Winzer | |
| 2004/0202395 A1 | 10/2004 | Yap et al. | 385/1 |
| 2005/0220411 A1 | 10/2005 | Ilchenko | |
| 2006/0045522 A1 | 3/2006 | Gill et al. | |
| 2007/0009205 A1 * | 1/2007 | Maleki et al. | 385/27 |

(Continued)

FOREIGN PATENT DOCUMENTS

WO    WO 01/18598 A1    3/2001

(Continued)

OTHER PUBLICATIONS

G. Lenz, et al., "Optical Delay Lines Based on Optical Filters," IEEE Journal of Quantum Electronics, 2001, vol. 37, No. 4, pp. 525-532.

(Continued)

*Primary Examiner* — Danny Leung
(74) *Attorney, Agent, or Firm* — Mendelsohn, Drucker & Associates, P.C.; Yuri Gruzdkov; Steve Mendelsohn

(57) ABSTRACT

According to one embodiment, a microwave photonic band-stop (MPBS) filter uses an electrical input signal to drive an optical Mach-Zehnder modulator. A modulated optical carrier produced by the modulator is applied to an optical filter having at least two tunable spectral attenuation bands that are located substantially symmetrically on either side of the carrier frequency. The resulting filtered optical signal is applied to an optical-to-electrical (O/E) converter to produce an electrical output signal.

20 Claims, 6 Drawing Sheets

U.S. PATENT DOCUMENTS

2007/0147724 A1    6/2007    Ishizaka

FOREIGN PATENT DOCUMENTS

WO    WO 2007/074485 A1    7/2007
WO    WO 2009048572 A1    4/2009

OTHER PUBLICATIONS

C.K. Madsen, et al., "A Tunable Ultra-Narrowband Filter for Subcarrier Processing and Optical Monitoring," Optical Fiber Communication Conference, OFC, Los Angeles, CA, vol. 1, Feb. 23-27, 2004, (3 pages).

Richard A. Soref, "Silicon-Based Optoelectronics," Proceedings of the IEEE, vol. 81, No. 12, Dec. 1993, pp. 1687-1706.

C. Angulo Barrios, et al., "Electrooptic Modulation of Silicon-on-Insulator Submicrometer-Size Waveguide Devices," Journal of Lightwave Technology, vol. 21, No. 10, Oct. 2003, pp. 2332-2339.

M.S. Rasras et al., "Demonstration of a Fourth-Order Pole-Zero Optical Filter Integrated Using CMOS Processes," J. Lightwave Technology, 2007, vol. 25, pp. 87-92.

José Capmany, et al., "A Tutorial on Microwave Photonic Filters," Journal of Lightwave Technology, vol. 24, No. 1, Jan. 2006, pp. 201-229.

Douglas M. Gill, "Resonator-Assisted Control of Radio-Frequency Response in an Optical Modulator," U.S. Appl. No. 11/869,205, filed Oct. 9, 2007, (28 pages).

Amnon Yariv, "Critical Coupling and Its Control in Optical Waveguide-Ring Resonator Systems," published in IEEE Photonics Technology Letters, vol. 14, No. 4, Apr. 2002, pp. 483-485.

Xiaobo Xie et al., "Linearized Mach-Zehnder Intensity Modulator," IEEE Photonics Technology Letters, vol. 15, No. 4, Apr. 2003, pp. 531-533.

Hidenori Takahashi et al., "Analysis of Negative Group Delay Response of All-Pass Ring Resonator With Mach-Zehnder Interferometer," IEEE Photonics Technology Letters, vol. 16, No. 9, Sep. 2004, pp. 2063-2065.

Jianyi Yang, "Influence of Loss on Linearity of Microring-Assisted Mach-Zehnder Modulator," Optics Express, vol. 12, No. 18, Sep. 6, 2004, pp. 4178-4188.

Douglas M. Gill et al., "Semiconductor Optical Modulator," U.S. Appl. No. 11/684,625, filed Mar. 11, 2007, (26 pages).

"CMOS Compatible Guided-Wave tunable Optical Equalizer," by D. M. Gill, et al., Optical Fiber Communication Conference and Exposition National Fiber Optic Engineers Conference, OFCNFOEC 2007, Mar. 25-29, 2007, XP031146788, pp. 1-3.

"Efficient Architectures for Exactly Realizing Optical Filters with Optimum Bandpass Designs," by C. K. Madsen, IEEE Photonics Technology Letters, vol. 10, No. 8, Aug. 1998, XP11046181, pp. 1136-1138.

Notification of Transmittal of the International Search Report and the Written Opinion of the International Searching Authority for PCT/US2009/003873 (filed on Jun. 30, 2009) dated Mar. 26, 2010.

D.M. Gill et al. "CMOS Compatible Guided-Wave Turnable Optical Equalizer" Lucent Technologies Bell Laboratories in OFC 2007, Anaheim, CA. Mar. 25-29, 2007.

* cited by examiner

100

240

440

US 8,014,676 B2

CMOS-COMPATIBLE TUNABLE MICROWAVE PHOTONIC BAND-STOP FILTER

This invention was made with Government support under Contract No. HR0011-05-C-0027 awarded by Defense Advanced Research Projects Agency (DARPA) under the EPIC (Electronic and Photonic Integrated Circuits) program. The Government has certain rights in this invention.

BACKGROUND OF THE INVENTION

1. Field of the Invention

The present invention relates to microwave circuits and, more specifically, to microwave filters.

2. Description of the Related Art

This section introduces aspects that may help facilitate a better understanding of the invention(s). Accordingly, the statements of this section are to be read in this light and are not to be understood as admissions about what is in the prior art and/or what is not in the prior art.

A band-stop or band-rejection filter is a filter that passes substantially unaltered most frequencies in its spectral range of operation, except for the frequencies in one or more specific spectral bands (stop bands), which are attenuated to a relatively low level. A band-stop filter performs a spectral function that is substantially opposite to that of a corresponding band-pass filter. A band-stop filter having a relatively narrow stop band is often referred to as a notch filter. Tunable band-stop filters find applications in communication systems, for example, at a receiver, to remove interference signals originating from co-located transmitters and/or from adjacent receive bands and, at a transmitter, to remove harmonic and spurious signals, e.g., caused by power-amplifier nonlinearities.

A microwave photonic filter is an optoelectronic (or electro-optic) circuit designed to perform functions that are analogous to those of a conventional microwave filter. As used in this specification, the term "microwave" designates electromagnetic signals having frequencies in the range from about 3 Hz to about 300 GHz. As such, this term covers radio-frequency (RF) signals and millimeter-wave signals in addition to what is traditionally referred to as microwave signals.

Microwave photonic filters have certain recognized advantages over conventional microwave filters. These advantages include, but are not limited to, a relatively low loss that is substantially independent of the signal frequency, relatively low sensitivity to electromagnetic interference (EMI), relatively low weight and small size, and amenability to spatial and spectral parallelism through the use of wavelength-division multiplexing (WDM) techniques. Implementing microwave photonic filters with standard silicon complementary-metal-oxide-semiconductor (CMOS) technology holds the promise of minimizing production costs, e.g., through monolithic integration of electronic and photonic functions and the use of the massive existing CMOS manufacturing infrastructure.

SUMMARY OF THE INVENTION

According to one embodiment, a microwave photonic band-stop (MPBS) filter uses an electrical input signal to drive an optical Mach-Zehnder modulator. A modulated optical carrier produced by the modulator is applied to an optical filter having at least two tunable spectral attenuation bands that are located substantially symmetrically on either side of the carrier frequency. The resulting filtered optical signal is applied to an optical-to-electrical (O/E) converter to produce an electrical output signal. Advantageously, the MPBS filter is capable of continuously tuning the spectral position of its microwave stop band between about 0 and about 20 GHz and is amenable to implementation in CMOS technology.

According to one embodiment, a microwave filter has an optical modulator adapted to modulate an optical signal having an optical carrier frequency to generate a modulated optical signal, said modulation being based on an electrical input signal. The microwave filter further has an optical filter having first and second spectral attenuation bands and adapted to filter said modulated optical signal to produce a filtered optical signal, wherein the optical carrier frequency is substantially centered between said first and second spectral attenuation bands. The microwave filter also has an optical-to-electrical (O/E) converter adapted to convert the filtered optical signal into an electrical output signal.

According to another embodiment, a method of processing electrical signals has the steps of: (A) modulating an optical signal having an optical carrier frequency to generate a modulated optical signal, said modulation being based on an electrical input signal; (B) filtering said modulated optical signal in an optical filter having first and second spectral attenuation bands to produce a filtered optical signal, wherein the optical carrier frequency is substantially centered between said first and second spectral attenuation bands; and (C) converting the filtered optical signal into an electrical output signal.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Figure 1A:
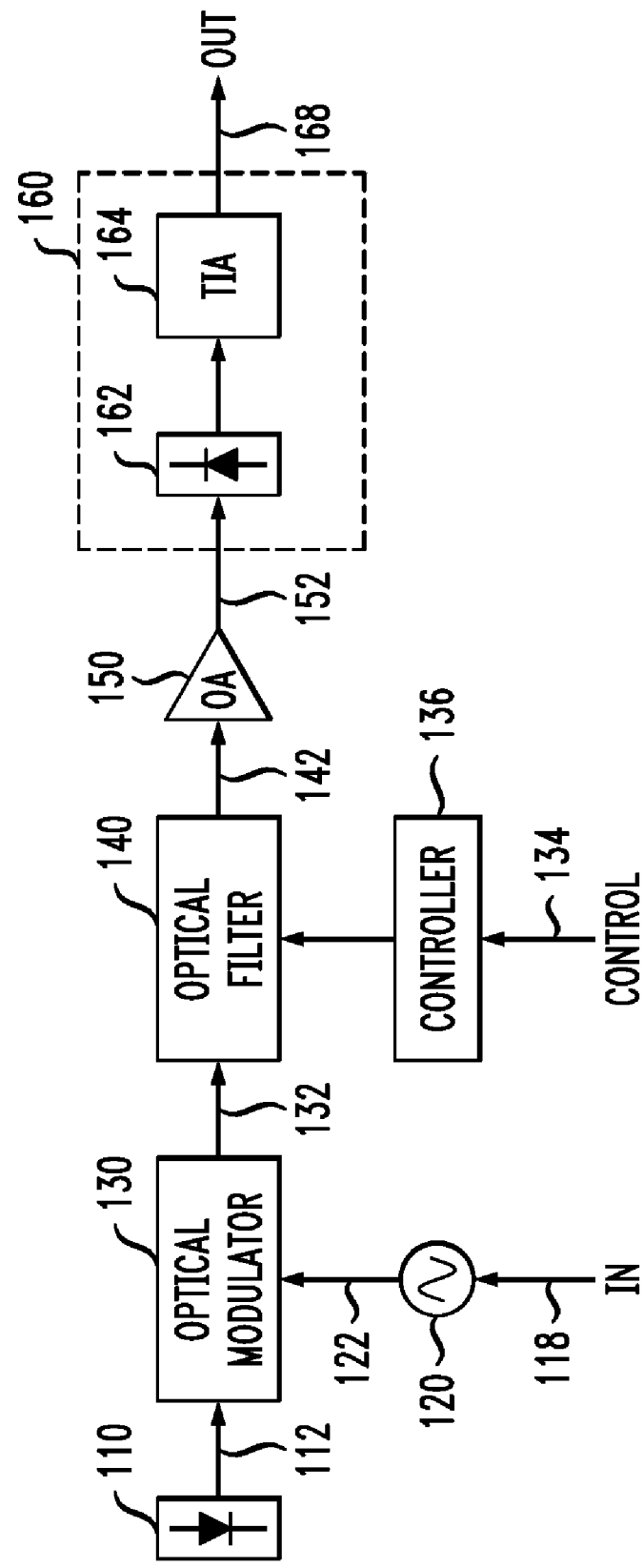
FIG. 1A shows a block diagram of a microwave photonic band-stop (MPBS) filter according to one embodiment of the invention.
Figure 1B:
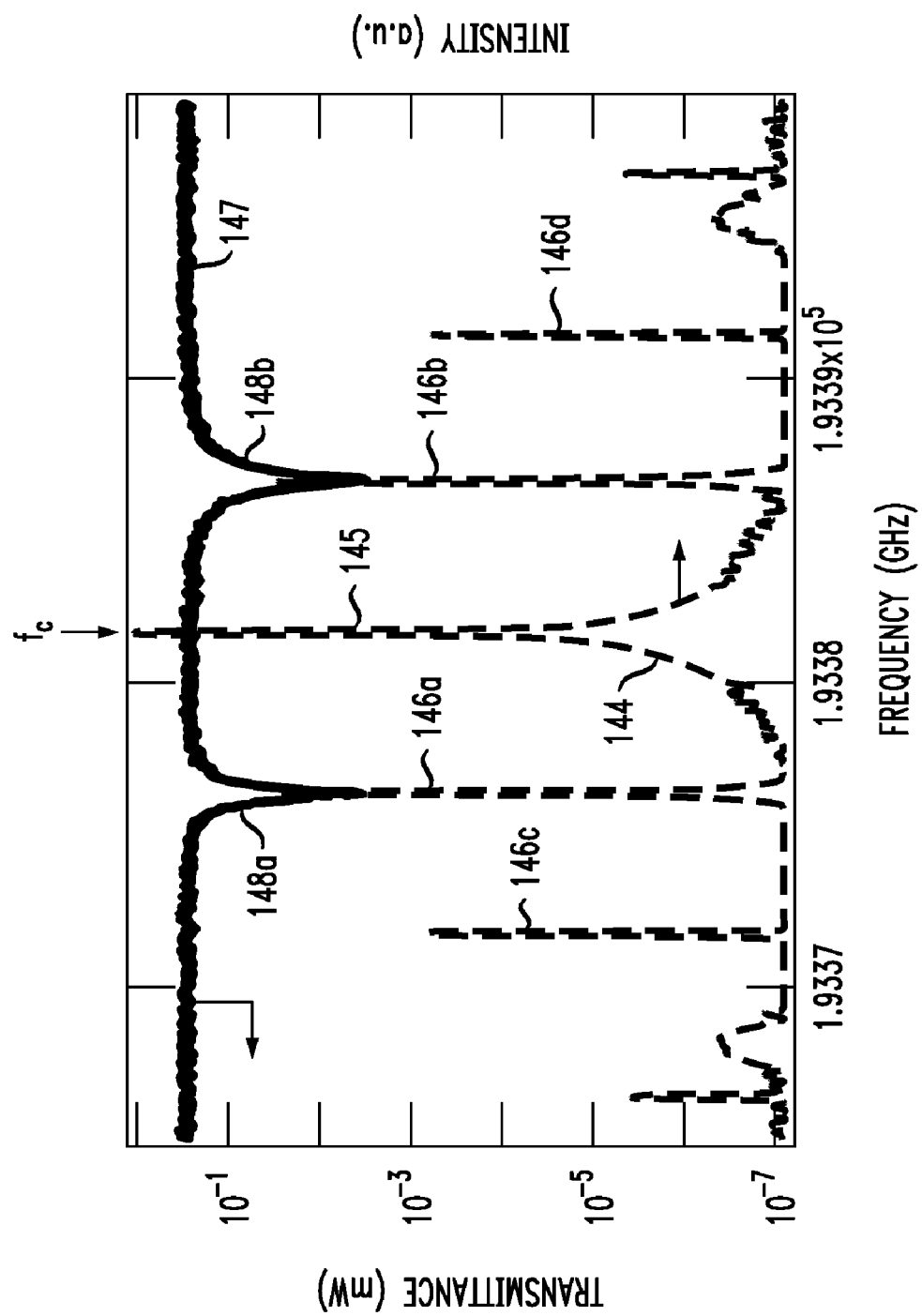
FIG. 1B graphically shows representative spectral characteristics of an optical filter used in the MPBS filter of FIG. 1A.
Figure 1C:
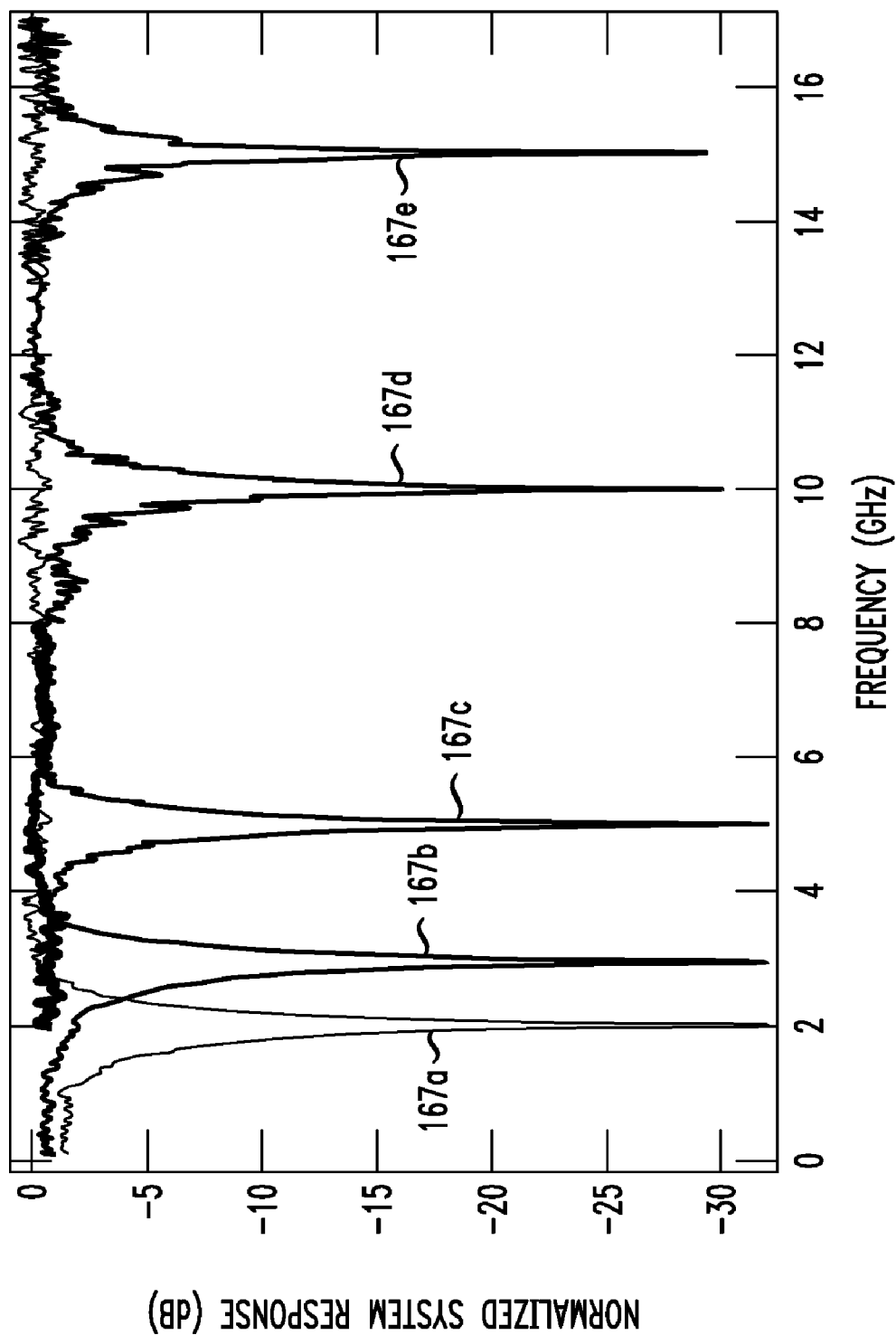
FIG. 1C graphically shows representative microwave stop bands that can be obtained with the MPBS filter of FIG. 1A.

FIGS. 1A-C illustrate a microwave photonic band-stop (MPBS) filter 100 according to one embodiment of the invention. More specifically, FIG. 1A shows a block diagram of MPBS filter 100. FIG. 1B graphically shows representative spectral characteristics of an optical filter 140 used in MPBS filter 100. FIG. 1C graphically shows representative microwave stop bands that can be obtained with MPBS filter 100.

Referring to FIG. 1A, MPBS filter 100 receives a microwave electrical input signal 118 and processes it as described below to produce an electrical output signal 168. In a typical configuration, the spectra of signals 118 and 168 differ in that the latter does not have a frequency component corresponding to the stop band of MPBS filter 100. In one embodiment, MPBS filter 100 is adapted to change the spectral position of the stop band based on an external control signal 134.

MPBS filter 100 has a light source (e.g., a laser) 110 configured to generate a CW beam 112 and apply that beam to an optical modulator 130. A driver circuit 120 receives input signal 118 and transforms that signal into a drive signal 122 suitable for driving optical modulator 130. For example, driver circuit 120 might amplify and/or bias (i.e., shift the dc level of) input signal 118 to produce drive signal 122. Optical modulator 130 driven by drive signal 122 modulates CW beam 112 to produce a modulated optical signal 132. In one embodiment, optical modulator 130 is a double-sided LiNbO$_3$ Mach-Zehnder modulator.

Modulated optical signal 132 is filtered by optical filter 140, the spectral characteristics of which are described in more detail below. A controller circuit 136 receives external control signal 134 and, based on that control signal, appropriately configures optical filter 140 for filtering signal 132. A resulting filtered signal 142 is amplified in an optional optical amplifier (OA) 150. An optical-to-electrical (O/E) converter 160 then converts an amplified optical signal 152 produced by OA 150 into electrical output signal 168. In the embodiment of FIG. 1A, O/E converter 160 comprises a fast photodiode 162 and a trans-impedance amplifier (TIA) 164. One skilled in the art will appreciate that, in other embodiments, other suitable O/E converters may similarly be used.

Referring to FIG. 1B, a dashed line 144 depicts a spectrum of modulated optical signal 132 produced by optical modulator 130 when input signal 118 is a sinusoidal waveform having a frequency of about 5 GHz. Spectrum 144 has (i) a center band 145 whose maximum is located at a frequency of about 193.382 THz, which is, in this configuration, a carrier frequency ($f_c$) of beam 112, and (ii) a progression of sidebands 146 whose intensity diminishes rather quickly with an increase in the spectral separation between the center band and the sideband. For example, the two most intense (first-order) sidebands 146a-b have their respective maxima spectrally separated from carrier frequency $f_c$ by about 5 GHz; the two next highest in intensity (second-order) sidebands 148c-d have their respective maxima spectrally separated from carrier frequency $f_c$ by about 10 GHz, etc. Note that the carrier frequency of 193.382 THz corresponds to a carrier wavelength of about 1550.3 nm.

For MPBS filter 100 to produce a microwave stop band at about 5 GHz, optical filter 140 is configured to have a transmission spectrum 147 having two attenuation bands 148a-b whose minima are (i) located substantially symmetrically on either side of carrier frequency $f_c$ and (ii) are spectrally separated from one another by about 10 GHz, with each minimum being spectrally separated from $f_c$ by about 5 GHz. This spectral configuration lines up attenuation bands 148a-b with modulation sidebands 146a-b, respectively, and causes optical filter 140 to substantially reject those modulation sidebands. Thus, the optical spectrum of filtered optical signal 142 has center band 145, second-order sidebands 146c-d, etc., but does not have first-order sidebands 146a-b.

The rejection of first-order sidebands 146a-b causes the RF spectrum of electrical output signal 168 to have a dip at about 5 GHz. The shape (e.g., the depth and width) of the dip depends on the shapes of attenuation bands 148a-b. For example, in FIG. 1C, a curve labeled 167c shows a spectral transfer function of MPBS filter 100 when optical filter 140 has transmission spectrum 147 shown in FIG. 1B. Note that the notch-like character of attenuation bands 148a-b causes MPBS filter 100 to act as a microwave notch filter. One skilled in the art will appreciate that other shapes of attenuation bands 148a-b will cause MPBS filter 100 to have a stop band of a corresponding different spectral shape (e.g., having a different width and/or depth).

Referring to FIG. 1C, curves 167a-e show representative spectral transfer functions of MPBS filter 100 corresponding to different configurations of optical filter 140. More specifically, each of those configurations is analogous to that shown in FIG. 1B, but with a different amount of spectral separation between attenuation bands 148a-b and carrier frequency $f_c$. For example, transfer function 167a is produced when each of attenuation bands 148a-b is spectrally separated from $f_c$ by about 2 GHz. Similarly, transfer functions 167b,d,e are produced when each of attenuation bands 148a-b is spectrally separated from $f_c$ by about 3, 10, and 15 GHz, respectively.

In one embodiment, optical filter 140 is continuously tunable so as to maintain attenuation bands 148a-b at substantially symmetrical spectral positions with respect to carrier frequency $f_c$, while being able to change the value of the spectral separation between the attenuation bands and the carrier frequency. This continuous tunability of optical filter 140 enables MPBS filter 100 to function as a continuously tunable microwave band-stop filter. More specifically, an increase in the spectral separation between attenuation bands 148a-b will cause a corresponding shift of the microwave stop band of MPBS filter 100 to a higher frequency. Conversely, a decrease in the spectral separation between attenuation bands 148a-b will cause a corresponding shift of the microwave stop band to a lower frequency.

Figure 2A:
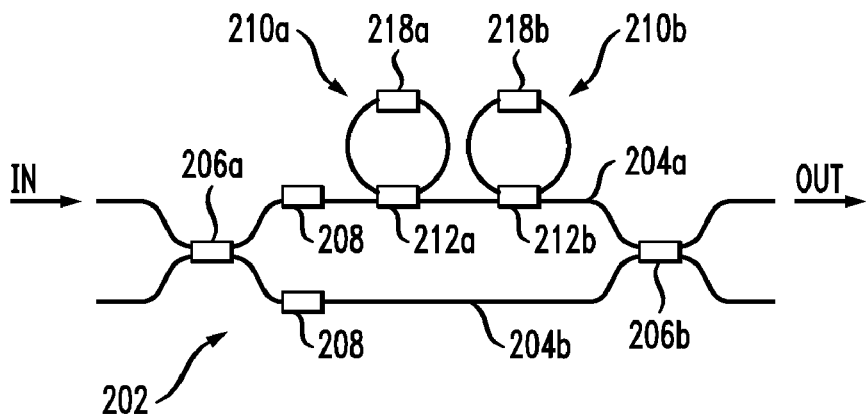
FIG. 2A shows a schematic diagram of a tunable optical filter (TOF) that can be used in the MPBS filter of FIG. 1A according to one embodiment of the invention.
Figure 2B:
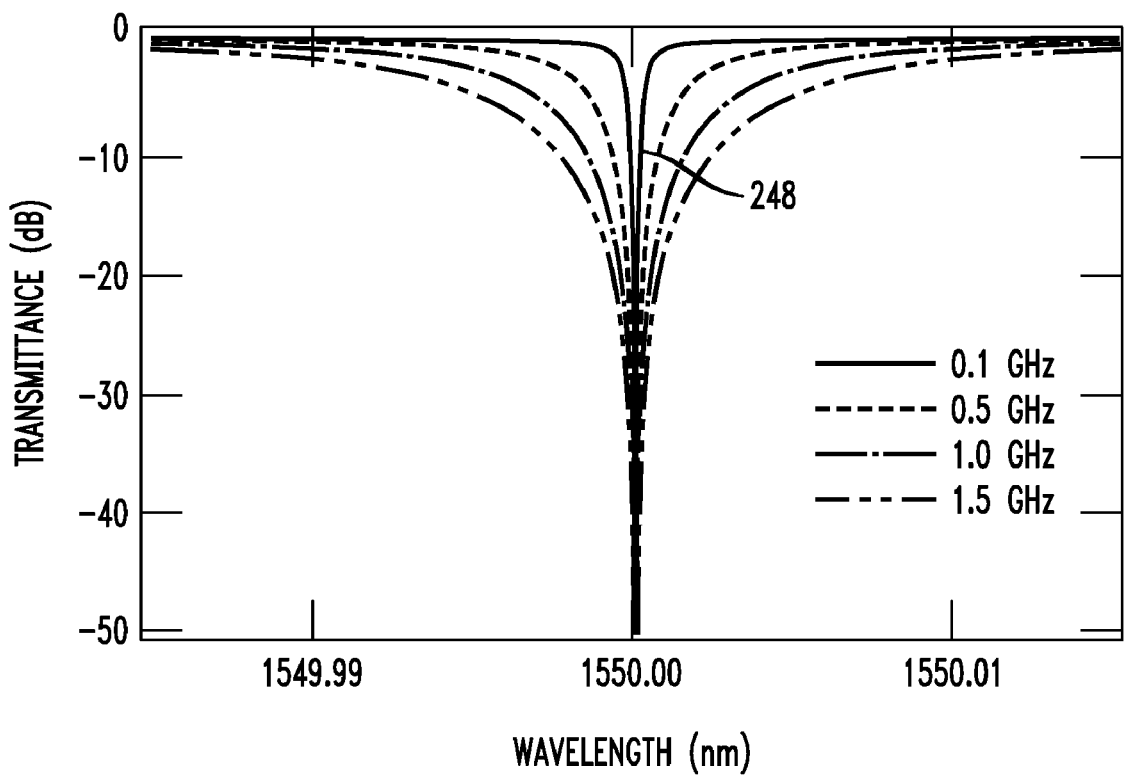
FIGS. 2B-C graphically illustrate spectral characteristics of the TOF shown in FIG. 2A.
Figure 2C:
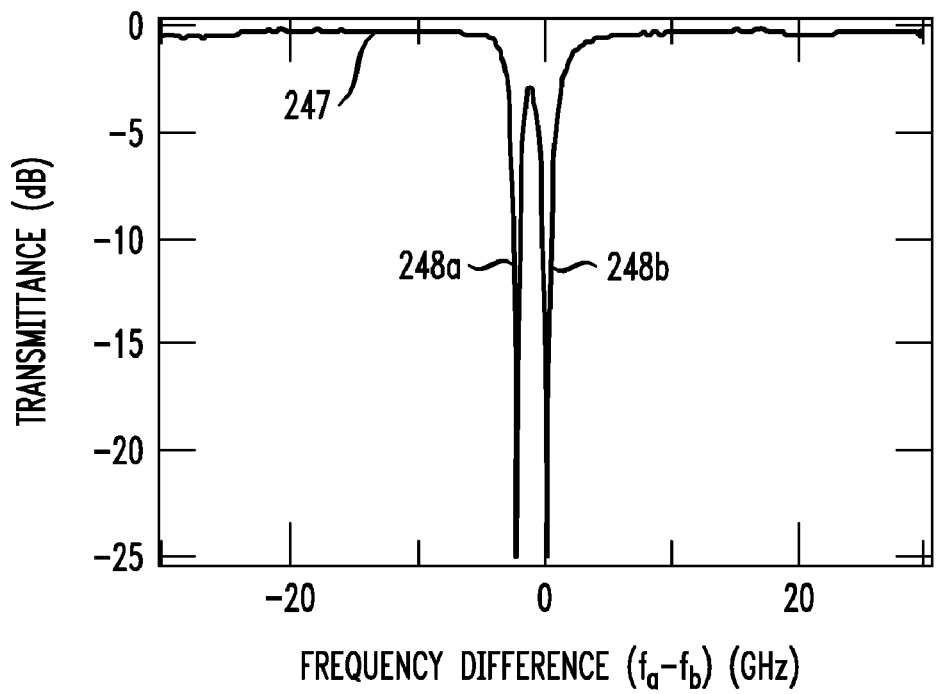

FIGS. 2A-C illustrate a tunable optical filter (TOF) 240 that can be used as optical filter 140 according to one embodiment of the invention. More specifically, FIG. 2A shows a schematic diagram of TOF 240. FIGS. 2B-C graphically illustrate spectral characteristics of TOF 240.

Referring to FIG. 2A, TOF 240 is a waveguide circuit having a Mach-Zehnder interferometer (MZI) 202. Two internal arms 204a-b of MZI 202 are coupled between two optical couplers 206a-b. Optical coupler 206a is configured to divide the power of an input signal, e.g., signal 132 (see FIG. 1A), substantially equally between MZI arms 204a-b. Optical coupler 206b serves to mix the optical signals emerging from MZI arms 204a-b. Each MZI arm 204 has a tunable phase shifter 208. MZI arm 204a is coupled to two optical resonators 210a-b via optical couplers 212a-b, respectively. Each resonator 210 incorporates a corresponding tunable phase shifter 218.

Each of optical couplers 212a-b is tunable and is configured to control the optical coupling strength between MZI arm 204a and the corresponding one of resonators 210a-b. In one embodiment, optical coupler 212 is a thermo-optic coupler whose coupling strength depends on the temperature. Accordingly, TOF 240 is adapted to tune optical couplers 212a-b by changing their respective temperatures. Several thermo-optic coupler designs, each suitable for implementing optical coupler 212, are disclosed, e.g., in U.S. patent application Ser. No. 11/869,205, which is incorporated herein by reference in its entirety. In various other embodiments, methods, such as carrier injection, carrier depletion, stress, photo-refractive effects, or other techniques that enable controllable change of the effective refractive index of waveguide material(s), can be used as a physical principle of operation of optical coupler 212.

A suitable phase shifter that can be used to implement each of phase shifters 208 and 218 is disclosed, e.g., in U.S. Patent Application Publication No. 2006/0045522, which is incorporated herein by reference in its entirety. Phase shifters 208 serve to adjust the relative phase difference between the optical sub-beams in MZI arms 204a-b, e.g., when at least one of optical couplers 212a-b has been tuned. Phase shifter 218 serves to control the effective optical length of the respective resonator 210, which length depends on the optical phase accrued by the optical signal in the phase shifter.

FIG. 2B graphically shows representative frequency-dependent losses in MZI arm 204a introduced by one resonator 210, with different loss curves corresponding to different configurations of the resonator. For example, loss curve 248 shown by a solid line has a spectral attenuation band with a 3-dB bandwidth of about 0.1 GHz. This attenuation band is located at about 1550 nm and is caused by destructive interference between the light propagating directly through MZI arm 204a and the light that first couples out of the MZI arm into resonator 210 and then couples back into the MZI arm after making one or more round trips through the resonator loop. One skilled in the art will appreciate that loss curve 248 has in fact multiple attenuation bands that are separated from one another by a frequency interval that corresponds to 1/T, where T is the round-trip transit time in resonator 210. However, due to a relatively narrow spectral window of FIG. 2B, other attenuation bands introduced by resonator 210 remain outside of that spectral window and are not shown. Frequency interval 1/T is a free spectral range (FSR) of resonator 210. A change in the phase shift introduced by phase shifter 218 will cause a spectral shift of the attenuation bands and will also change the FSR of resonator 210.

The various loss curves shown in FIG. 2B demonstrate that resonator 210 can be configured to produce attenuation bands having different 3-dB bandwidths. More specifically, FIG. 2B demonstrates that, by concertedly changing the settings of phase shifter 218 and optical coupler 212, the 3-dB attenuation bandwidth can be changed from about 0.1 GHz to about 1.5 GHz. As already indicated above, a change in the bandwidth of an optical attenuation band will cause a change in the bandwidth of the corresponding microwave stop band (e.g., one of those shown in FIG. 1C).

The coupling strength set by optical coupler 212 controls the partition of light between the direct propagation path and the loop "detour" path through optical resonator 210 and, therefore, determines the extent of light extinction due to the interference between the light entering the optical coupler from MZI arm 204a and the light entering the optical coupler from within the optical resonator. The bandwidths and the nulling depths of the corresponding spectral attenuation bands are determined by the coupling strengths set by optical couplers 212a-b and the amount of nonlinear phase introduced into MZI arm 204a by resonators 210a-b. The nonlinear phase produces a group-delay difference between MZI arms 204a-b, the amount of which is controlled by the coupling strengths. In general, a desired amount of optical group delay in MZI arm 204a can be obtained by tuning thermo-optic couplers 212a-b to change the coupling strengths between the MZI arm and optical resonators 210a-b, respectively. A good quantitative description of the effect of coupling strength on resonator-induced optical group delay can be found, e.g., in an article by G. Lenz, et al., "Optical Delay Lines Based on Optical Filters," IEEE Journal of Quantum Electronics, 2001, v. 37, No. 4, pp. 525-532, which is incorporated herein by reference in its entirety. In a representative embodiment, optical coupler 212 can be used to tune the magnitude (nulling depth) of the corresponding attenuation band between about 0 and 30 dB.

FIG. 2C shows a representative transmission spectrum 247 of optical filter 240. Transmission spectrum 247 has two spectral attenuation bands 248a-b produced by optical resonators 210a-b, respectively. The minimum of attenuation band 248b is located at about 193.414 THz. The minimum of attenuation band 248a is offset from the minimum of attenuation band 248b by about 2 GHz. As indicated above, resonators 210a-b are independently tunable, which enables optical filter 240 to appropriately position attenuation bands 248a-b with respect to carrier frequency $f_c$, e.g., as shown in FIG. 1B. In one embodiment, the FSRs of optical resonators 210a-b are about 40 GHz, which enables MPBS filter 100 employing optical filter 240 to have a continuous tunable stop-band range from about 0 GHz to about 20 GHz.

Figure 3:
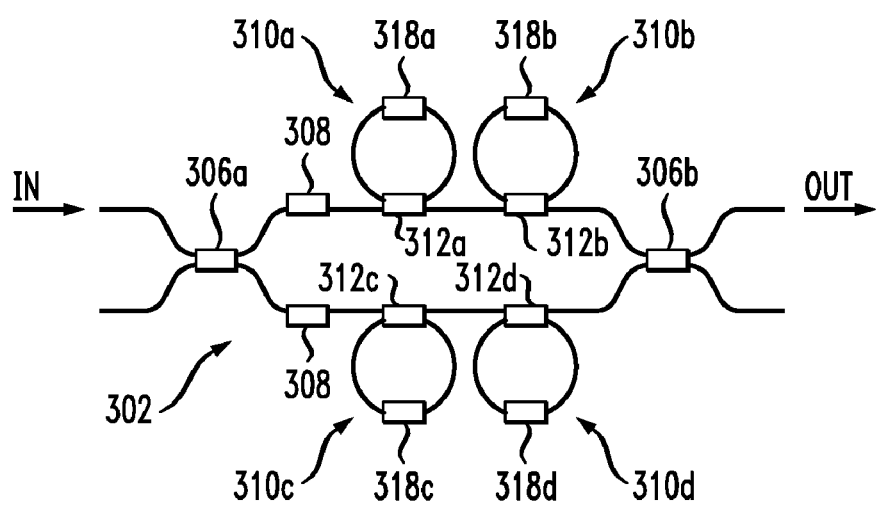
FIG. 3 shows a schematic diagram of a TOF that can be used in the MPBS filter of FIG. 1A according to another embodiment of the invention.

FIG. 3 shows a schematic diagram of TOF 340 that can be used as optical filter 140 according to another embodiment of the invention. TOF 340 is generally analogous to TOF 240, and analogous elements of the two TOFs are designated with labels having the same last two digits. However, one difference between TOFs 240 and 340 is that the latter has four, as opposed to two, optical resonators. More specifically, TOF 340 has two additional optical resonators 310c-d coupled to MZI arm 304b. In operation, optical couplers 312a-b are configured similar to optical couplers 212a-b, respectively. In contrast, optical couplers 312c-d are configured to substantially decouple (have a substantially zero optical coupling strength between) optical resonators 310c-d and MZI arm 304b. As a result, TOF 340 functions and can be operated similar to TOF 240. Additional details on the design and operation principles of TOF 340 can be found, e.g., in an article by M. S. Rasras et al., entitled "Demonstration of a Fourth-Order Pole-Zero Optical Filter Integrated Using CMOS Processes," J. Lightwave Technology, 2007, v. 25, pp. 87-92, which is incorporated herein by reference in its entirety.

Figure 4:
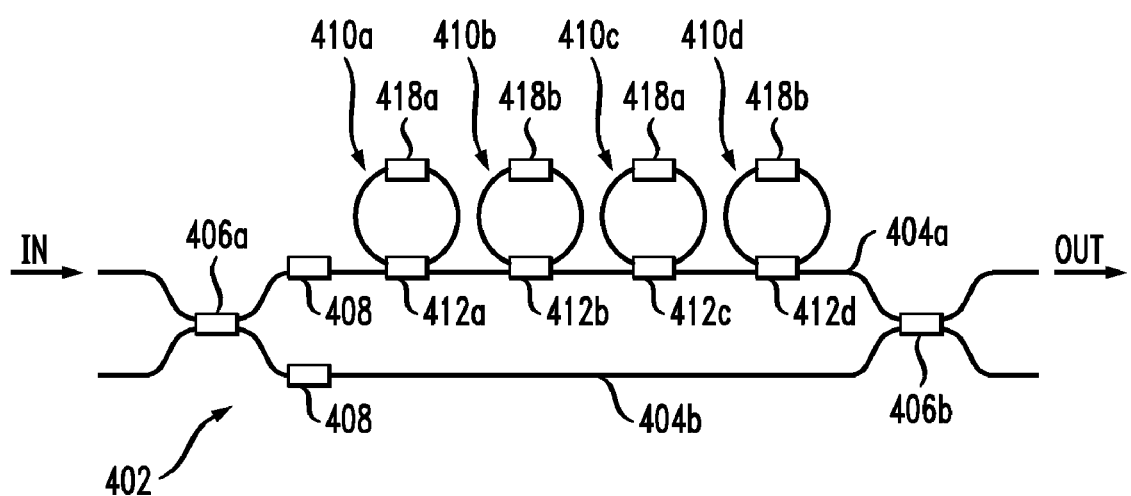
FIG. 4 shows a schematic diagram of a TOF that can be used in the MPBS filter of FIG. 1A according to yet another embodiment of the invention.

FIG. 4 shows a schematic diagram of TOF 440 that can be used as optical filter 140 according to yet another embodiment of the invention. TOF 440 is generally analogous to TOF 240, and analogous elements of the two TOFs are designated with labels having the same last two digits. However, one difference between TOFs 240 and 440 is that the latter has four, as opposed to two, optical resonators. More specifically, TOF 440 has two additional optical resonators 410c-d coupled to the same MZI arm as the first two optical resonators 410a-b.

In one configuration, optical couplers 412a-b are configured similar to optical couplers 212a-b, respectively. In contrast, optical couplers 412c-d are configured to substantially decouple optical resonators 410c-d from MZI arm 404a. As a result, TOF 440 functions and can be operated similar to TOF 240.

In another configuration, optical resonators 410a-b are configured to produce a first pair of spectral attenuation bands analogous to attenuation bands 148a-b (see FIG. 1B) and having a first value ($\Delta f_1$) of spectral separation from carrier frequency $f_c$, while optical resonators 410c-d are configured to produce a second pair of optical attenuation bands analogous to attenuation bands 148a-b, but having a different second value ($\Delta f_2$) of spectral separation from the carrier frequency. MPBS filter 100 employing optical filter 440 so configured has a spectral transfer function with two notches, each similar, e.g., to the notch of spectral transfer function 167c shown in FIG. 1C. The minimum of the first notch is located at the microwave frequency corresponding to $\Delta f_1$, while the minimum of the second notch is located at the microwave frequency corresponding to $\Delta f_2$. This configuration can be used, e.g., for enhanced rejection of certain microwave waveforms. More specifically, to effectively reject a microwave waveform that results in relatively strong first- and second-order modulation sidebands in signal 132 (see FIG. 1), optical resonators 410a-b are configured to reject the first-order modulation sidebands while optical resonators 410*c-d* are configured to reject the second-order modulation sidebands. In one embodiment, additional optical-resonator pairs (not shown) can be coupled to MZI arm 404*a* and configured to reject third-order, fourth-order, etc., modulation sidebands.

Various embodiments of tunable MPBS filters of the invention advantageously provide some or all of the following benefits. An MPBS filter of the invention can be implemented in a single integrated CMOS circuit, which makes the filter amenable to large-volume and low-cost production. An added benefit of the CMOS compatibility is that the relatively high refraction-index contrast of silicon/silicon oxide optical waveguides enables relatively high packing densities of circuit components, which leads to advantageously compact devices. In addition, the relatively high refraction-index contrast of silicon/silicon oxide waveguides can be used to create and utilize optical resonators with relatively large FSRs. In a representative CMOS implementation, an MPBS filter of the invention is capable of providing a notch-like stop band having a 3-dB bandwidth as narrow as about 0.1 GHz with the spectral position of that stop band being continuously tunable from about 0 GHz to about 20 GHz. The MPBS filter is substantially immune to RF EMI and has a lower overall complexity than a functionally comparable conventional microwave filter. When implemented in CMOS silicon, the MPBS filter is generally capable of using optical carrier frequencies from the C-band (1525-1565 nm), thereby taking advantage of the availability of a large variety of coherent light sources developed for that spectral range in optical communications applications.

While this invention has been described with reference to illustrative embodiments, this description is not intended to be construed in a limiting sense. Although a representative MPBS filter of the invention has been described with respect to possible implementation as a single integrated circuit, it can also be implemented as a multi-chip module, a single card, or a multi-card circuit pack. MPBS filters of the invention can be implemented in any suitable technology different from CMOS. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

What is claimed is:

1. A device, comprising:
   an optical modulator adapted to modulate an optical signal having an optical carrier frequency to generate a modulated optical signal, said modulation being based on an electrical input signal;
   an optical filter having first and second spectral attenuation bands and adapted to filter said modulated optical signal to produce a filtered optical signal, wherein the optical carrier frequency is substantially centered between said first and second spectral attenuation bands; and
   an optical-to-electrical (O/E) converter adapted to convert the filtered optical signal into an electrical output signal, wherein the optical filter comprises:
   a Mach-Zehnder interferometer having first and second internal interferometer arms, both coupled between two optical couplers; and
   first, second, third, and fourth optical resonators, each coupled to the first interferometer arm.

2. The invention of claim 1, wherein:
   the optical filter further has third and fourth spectral attenuation bands;
   the optical carrier frequency is substantially centered between said third and fourth spectral attenuation bands; and
   spectral separation between the first and second spectral attenuation bands is different from spectral separation between the third and fourth spectral attenuation bands.

3. The invention of claim 1,
   optical losses induced by the first optical resonator result in the first spectral attenuation band; and
   optical losses induced by the second optical resonator result in the second spectral attenuation band.

4. The invention of claim 3, wherein each of the third and fourth optical resonators is coupled to the first interferometer arm via a corresponding tunable optical coupler.

5. The invention of claim 4, wherein each of said tunable optical couplers is configured to provide a substantially zero optical coupling strength between the respective optical resonator and the interferometer arm.

6. The invention of claim 4, wherein:
   the optical filter further has third and fourth spectral attenuation bands;
   optical losses induced by the third optical resonator result in the third spectral attenuation band; and
   optical losses induced by the fourth optical resonator result in the fourth spectral attenuation band.

7. The invention of claim 6, wherein:
   the optical carrier frequency is substantially centered between the third and fourth spectral attenuation bands; and
   spectral separation between the first and second spectral attenuation bands is different from spectral separation between the third and fourth spectral attenuation bands.

8. The invention of claim 1, further comprising a control circuit adapted to configure the optical filter to change spectral separation between the first and second attenuation bands.

9. The invention of claim 8, wherein the spectral separation is continuously tunable between zero and 20 GHz.

10. The invention of claim 1, further comprising:
a coherent light source adapted to generate the optical signal having said optical carrier frequency; and
a driver circuit adapted to convert the electrical input signal into a drive signal for driving the optical modulator.

11. The invention of claim 1, wherein the optical modulator is a double-sided Mach-Zehnder modulator.

12. The invention of claim 1, wherein the device is an integrated circuit fabricated using CMOS technology.

13. A method of processing electrical signals, comprising:
modulating an optical signal having an optical carrier frequency to generate a modulated optical signal, said modulation being based on an electrical input signal;
filtering said modulated optical signal in an optical filter having first and second spectral attenuation bands to produce a filtered optical signal, wherein the optical carrier frequency is substantially centered between said first and second spectral attenuation bands; and
converting the filtered optical signal into an electrical output signal, wherein the optical filter comprises:
a Mach-Zehnder interferometer having first and second internal interferometer arms, both coupled between two optical couplers; and
first, second, third, and fourth optical resonators, each coupled to the first interferometer arm.

14. The invention of claim 13, wherein:
the optical filter further has third and fourth spectral attenuation bands;
the optical carrier frequency is substantially centered between said third and fourth spectral attenuation bands; and
spectral separation between the first and second spectral attenuation bands is different from spectral separation between the third and fourth spectral attenuation bands.

15. The invention of claim 13, further comprising configuring the optical filter to change spectral separation between the first and second spectral attenuation bands.

16. The invention of claim 13, further comprising generating the optical signal having said optical carrier frequency with a coherent light source.

17. The invention of claim 13, wherein:
optical losses induced by the first optical resonator result in the first spectral attenuation band;
optical losses induced by the second optical resonator result in the second spectral attenuation band;
the optical filter further comprises third and fourth optical resonators, each coupled to the first interferometer arm via a corresponding tunable optical coupler;
the optical filter further has third and fourth spectral attenuation bands;
optical losses induced by the third optical resonator result in the third spectral attenuation band;
optical losses induced by the fourth optical resonator result in the fourth spectral attenuation band the optical carrier frequency is substantially centered between the third and fourth spectral attenuation bands; and
spectral separation between the first and second spectral attenuation bands is different from spectral separation between the third and fourth spectral attenuation bands.

18. The invention of claim 13, wherein:
an electrical input signal is a multi-frequency signal having an undesired frequency component; and
the method further comprises selecting spectral separation between the first and second attenuation bands to suppress said undesired frequency component in the electrical output signal.

19. The invention of claim 1, wherein the optical filter has no optical resonators coupled to the second interferometer arm.

20. A device, comprising:
an optical modulator adapted to modulate an optical signal having an optical carrier frequency to generate a modulated optical signal, said modulation being based on an electrical input signal;
an optical filter having first and second spectral attenuation bands and adapted to filter said modulated optical signal to produce a filtered optical signal, wherein the optical carrier frequency is substantially centered between said first and second spectral attenuation bands; and
an optical-to-electrical (O/E) converter adapted to convert the filtered optical signal into an electrical output signal, wherein the optical filter comprises:
a Mach-Zehnder interferometer having first and second internal interferometer arms, both coupled between two optical couplers;
first and second optical resonators, each coupled to the first interferometer arm, wherein:
optical losses induced by the first optical resonator result in the first spectral attenuation band; and
optical losses induced by the second optical resonator result in the second spectral attenuation band; and
third and fourth optical resonators, each coupled to a corresponding one of the first and second interferometer arms via a corresponding tunable optical coupler, wherein:
the optical filter further has third and fourth spectral attenuation bands;
optical losses induced by the third optical resonator result in the third spectral attenuation band;
optical losses induced by the fourth optical resonator result in the fourth spectral attenuation band; and
both the third optical resonator and the fourth optical resonator are coupled to the first interferometer arm.

* * * * *